United States Patent [19]

Ishioka et al.

[11] Patent Number: 5,617,388
[45] Date of Patent: Apr. 1, 1997

[54] DISC RECORDING/REPRODUCING APPARATUS WHICH USES STORED ECCENTRICITY DATA TO MAINTAIN THE READ/WRITE HEAD AT A CONSTANT RADIAL POSITION DURING A STAND-BY MODE

[75] Inventors: Hideaki Ishioka; Yoshikazu Onuki, both of Kanagawa; Toru Takeda, Saitama, all of Japan

[73] Assignee: Sony Corporation, Tokyo, Japan

[21] Appl. No.: 249,395

[22] Filed: May 26, 1994

[30] Foreign Application Priority Data

May 31, 1993 [JP] Japan .................................... 5-149740

[51] Int. Cl.⁶ .............................................. G11B 7/085
[52] U.S. Cl. ................................ 369/44.28; 369/44.32; 369/44.29; 369/58; 360/77.04
[58] Field of Search ........................... 369/44.13, 44.35, 369/44.25, 44.32, 44.34, 44.28, 44.27, 54, 44.29, 58; 360/77.04

[56] References Cited

U.S. PATENT DOCUMENTS

| | | | |
|---|---|---|---|
| 4,135,217 | 1/1979 | Jaques et al. | 360/77 |
| 4,136,365 | 1/1979 | Chick et al. | 360/78 |
| 4,149,199 | 4/1979 | Chick et al. | 360/77 |
| 4,396,959 | 8/1983 | Harrison et al. | 360/77 |
| 4,488,187 | 12/1984 | Alaimo | 360/77 |
| 4,498,129 | 2/1985 | Velasquez | 364/174 |
| 5,027,336 | 6/1991 | Sugiura | 369/44.13 |
| 5,163,035 | 11/1992 | Horikiri | 369/44.13 X |
| 5,241,433 | 8/1993 | Anderson et al. | 360/77.04 |
| 5,369,345 | 11/1994 | Phan et al. | 360/77.04 X |

*Primary Examiner*—W. R. Young
*Attorney, Agent, or Firm*—Limbach & Limbach LLP

[57] ABSTRACT

A disc recording/reproducing apparatus includes a tracking servo system in which a recording/reproducing head is moved based upon a target position signal indicating its pre-set target position on a disc-shaped recording medium and in which the recording/reproducing head is controlled in its position by a driving unit which employs an output of a controller which is supplied with a position signal obtained by subtracting a deviation from a pre-set target position from the target position signal. The apparatus also includes an eccentricity data storage unit for storing eccentricity data indicating the tracking position of the recording/reproducing head which depends upon eccentricity of the disc-shaped recording medium. The eccentricity data from the eccentricity data storage unit is summed to the target position signal for controlling the position of the recording/reproducing head. In this manner, the current consumption when the recording/reproducing head is halted under a standby state on a pre-set track may be reduced.

8 Claims, 12 Drawing Sheets

ECCENTRICITY

DISC RECORDING/REPRODUCING APPARATUS WHICH USES STORED ECCENTRICITY DATA TO MAINTAIN THE READ/WRITE HEAD AT A CONSTANT RADIAL POSITION DURING A STAND-BY MODE

BACKGROUND OF THE INVENTION

1. Field of the Invention

This invention relates to a disc recording/reproducing apparatus for recording/reproducing signals to/from a disc-shaped recording medium, such as a magnetic disc, a magneto-optical disc or an optical disc.

2. Description of the Related Art

Referring to FIG. 1, a disc-shaped recording medium 65 may be exemplified by a magnetic disc, an optical disc, a magneto-optical disc or the like. The disc-shaped recording medium 65 has a preformatted region, in which data for producing tracking error signals or the address information indicating data positions on the disc are formed as a servo pattern at pre-set intervals, and a data region for recording data or reproducing the recorded data.

When the disc-shaped recording medium is rotated, minute movements of the center position of the recording medium, referred to herein as eccentricities, are produced as a result of chucking errors and pattern molding errors.

When tracking a recording/reproducing head 64 for reproducing data recorded on the disc-shaped recording medium 65 to a pre-set track on the recording medium, a target position signal indicating the pre-set track position is inputted to an additive node 61 which then adds a position detection signal to the target position signal. An output of the additive node is converted by a controller 62 and fed to a voice coil motor (VCM) 63 which is a driving means for minutely controlling the position of a recording/reproducing head 64 for maintaining the position of the pre-set track. The VCM 63 finely controls the position of the recording/reproducing head 64 to effect accurate tracking with respect to the pre-set track.

Playback signals from a disc 65 by the recording/reproducing head 64 are provided externally and are simultaneously supplied to a position detection unit 66. The position detection unit 66 detects an actual position of the recording/reproducing head and routes the detected head position as a position detection signal to the additive node 61.

When the recording/reproducing head 64 is to be set to stand-by state in the above-described disc recording/reproducing apparatus, the disc 65 is tracked to a pre-set track and halted at this stand-by position. However, due to the eccentricities, as described above, the center of a track circle may not be coincident with the center of rotation of the disc. Thus, it is necessary for the recording/reproducing head 64 to halt the head at the standby position while occasionally changing the distance between the head and the center of rotation of the disc. As a result, since the VCM is driven at all times with an offset frequency signal, a larger quantity of the electric current is wastefully consumed.

In addition, when measuring the frequency characteristics of the VCM while the recording/reproducing head is maintained on the pre-set track in the stand-by position, measurement is made in such a state wherein a bearing unit of the recording/reproducing head is offset by an amount corresponding to the eccentricity of the disc. As a result, it is not possible to measure minute amplitude characteristics of the VCM in the low frequency range.

OBJECT AND SUMMARY OF THE INVENTION

In view of the above-described status of the prior art, it is an object of the present invention to provide a disc recording/reproducing apparatus wherein it is possible to reduce the current consumption during the standby state of the recording/reproducing head and to make automatic measurement of frequency characteristics of the driving means of the recording/reproducing head, including minute amplitude characteristics in the low frequency range.

According to the present invention, there is provided a disc recording/reproducing apparatus comprising a disc-shaped recording medium and a tracking servo system for controlling the position of a recording/reproducing head. The recording/reproducing head is moved based upon a target position signal indicating a target position of the head on the disc-shaped recording medium. The position of the recording/reproducing head is controlled by a driving means employing an output of a controller fed with a deviation between the target position and an actual position of the recording/reproducing head.

The apparatus also comprises eccentricity data storage means for storing eccentricity data indicating a tracking position of the recording/reproducing head. The eccentricity data represents the actual eccentricity of the disc and is preferably measured during chucking of the disc-shaped recording medium. First addition means adds the eccentricity data from the eccentricity data storage means to the target position signal.

The apparatus also includes position controlling means for controlling the position of the recording/reproducing head using an output of the first addition means.

In one aspect of the present invention, the disc recording/reproducing apparatus also includes signal generating means for generating a sine wave of a pre-set frequency which is summed with a tracking error signal. As the recording/reproducing head is wobbled by the thus produced sum signal, measurement is made of frequency characteristics of the driving means and the transfer function of the tracking servo system.

In another aspect of the present invention, the disc recording/reproducing apparatus also includes signal generating means for generating plural sine waves of different frequencies which are summed with a tracking error signal. As the recording/reproducing head is wobbled by the thus produced sum signal, measurement is made of frequency characteristics of the driving means and the transfer function of the tracking servo system.

According to the present invention, the eccentricity data is summed with the target position signal and the resulting sum signal is supplied to the tracking servo system. Thus, for reducing the current consumption during the standby state of the recording/reproducing head is reduced. In addition, measurement signals from the sine wave generating means are summed in the standby state with the tracking error signal, and the resulting sum signal is used for wobbling the recording/reproducing head. This enables frequency characteristics of the driving means to be measured automatically.

That is, the disc recording/reproducing head according to the present invention includes eccentricity data storage means for storing eccentricity data of the disc-shaped recording medium. The eccentricity data from the eccentricity data storage means is summed with the target position signal for immobilizing the recording/reproducing head, thereby reducing the current consumption when the recording/reproducing head is halted under the standby state.

In addition, since measurement may be made of the frequency characteristics of the VCM including its minute amplitude characteristics in the low frequency range, it becomes possible to perform automatic adjustment of tracking and seek control parameters and calculations of feedforward data for feedforward control of the disc eccentricity using the frequency characteristics. Although plural frequencies may be set in making measurements of the frequency characteristics, it suffices to produce characteristics of the VCM in the disc rotation period if the above frequency characteristics are employed as constituent elements of the forward eccentricity data. On the other hand, it suffices to produce transfer function characteristics for the cut-off frequency if the frequency characteristics are used for automatic adjustment of the parameters of the controller. Thus the frequency characteristics for the pre-set frequency itself are crucial if such could be obtained.

DESCRIPTION OF THE PREFERRED EMBODIMENTS

Figure 1:
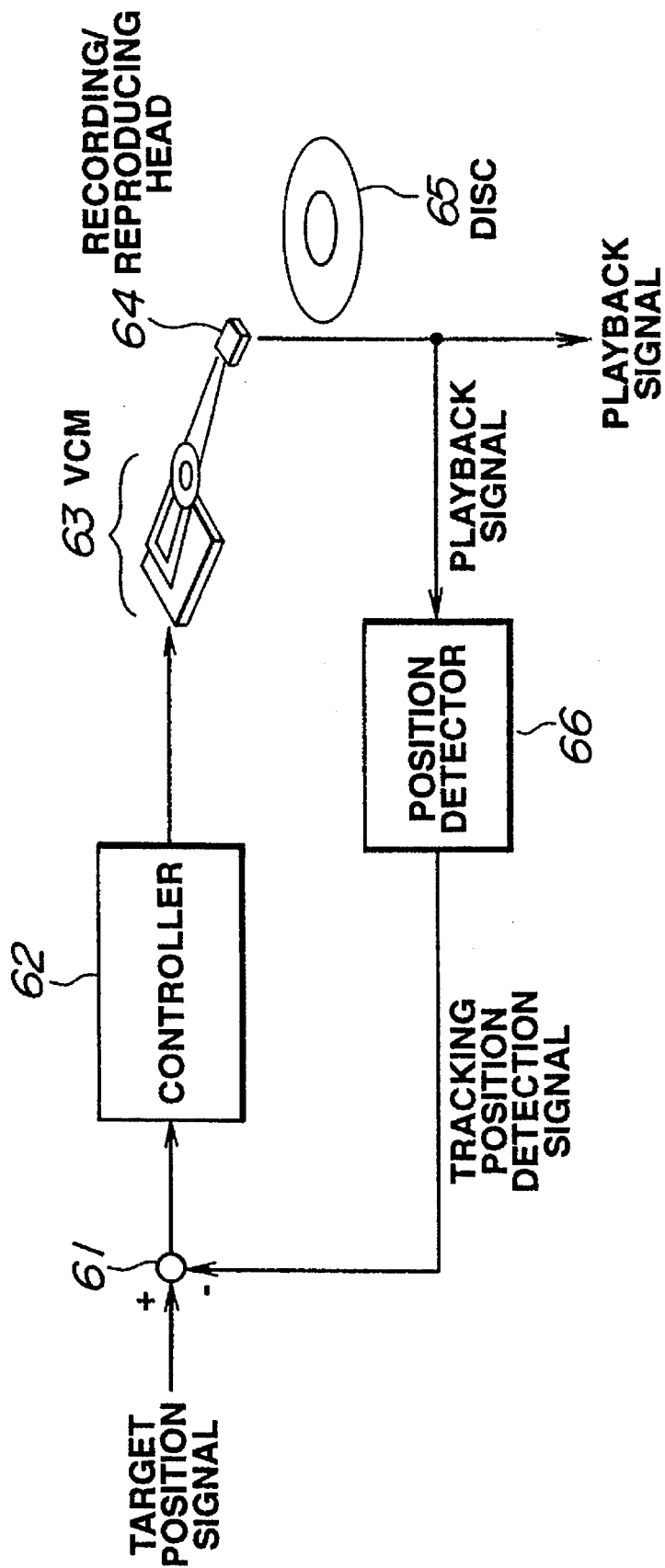
FIG. 1 shows a general arrangement of a conventional disc recording/reproducing apparatus.
Figure 2:
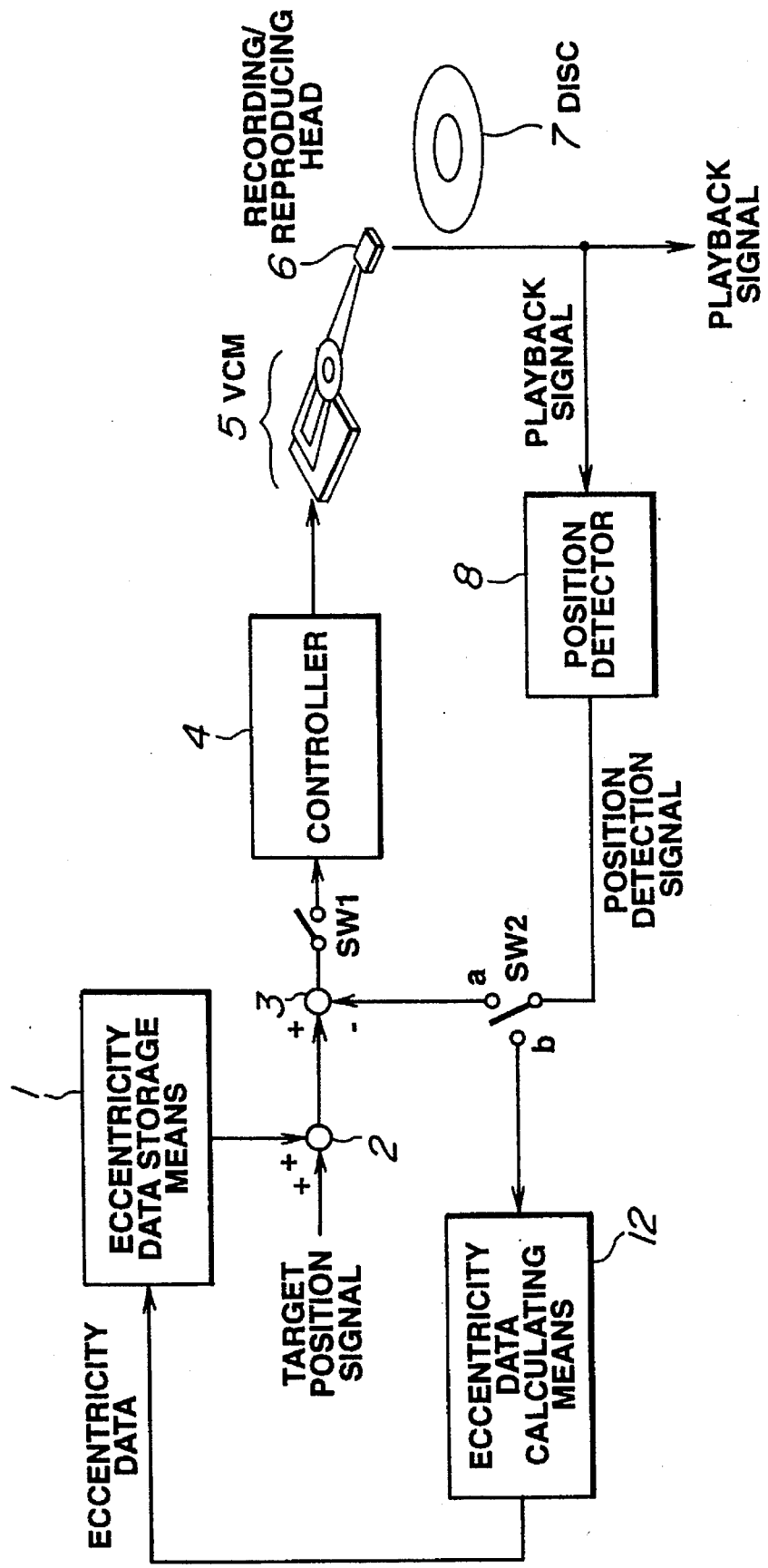
FIG. 2 shows a general arrangement of a disc recording/reproducing apparatus according to the present invention.

Referring to the drawings, preferred embodiments of the present invention will be explained in detail. FIG. 2 shows a general arrangement of a disc recording/reproducing apparatus embodying the present invention.

Figure 3:
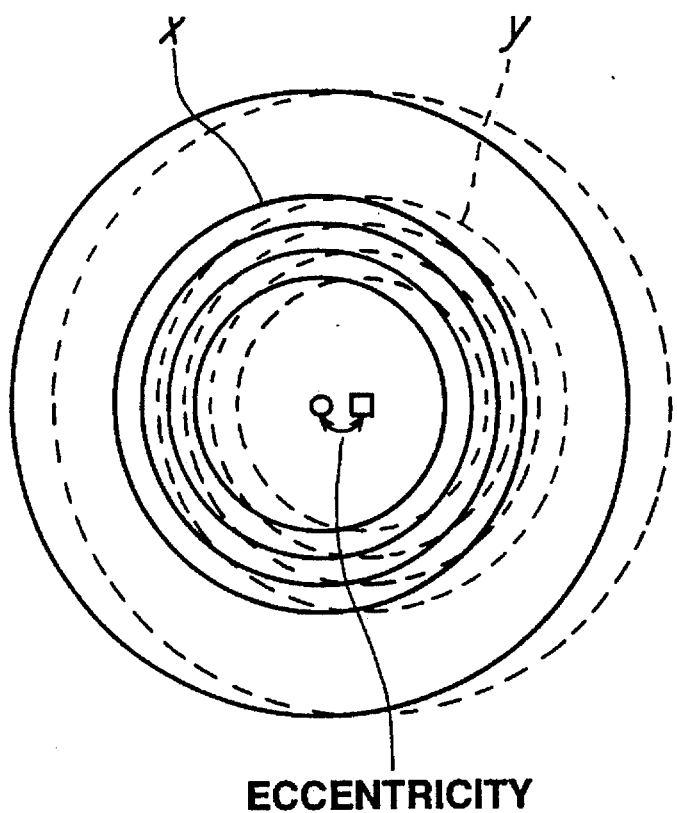
FIG. 3 shows the state of an eccentricity of a disc.

Referring to FIG. 3, the disc-shaped recording medium has a concentrically formed track indicated by a solid line x. The track circle center is indicated by a circle mark. If the center of rotation of the disc, indicated by a square mark, is not coincident with the track circle center, indicated by the circle mark, the state of eccentricity is produced. If the recording/reproducing head is fixed in this state, the locus of movement of the recording/reproducing head is as indicated by a broken line y.

In an eccentricity data storage means 1, shown in FIG. 2, eccentricity data, corresponding to playback position signals for one complete revolution of a disc 7, is stored, using a data table or functions, with a recording/reproducing head 6 having been set to a pre-set distance from the center of rotation of the disc 7.

The eccentricity data is measured in the following manner.

Basically, the eccentricity data is measured each time a system power source is turned on. When the power is turned on, the recording/reproducing head 6 is moved to a pre-set position, for example, on the innermost periphery on the disc 7. A driving current having a pre-set bias value is applied to the head 6 whereby the head 6 is substantially immobilized.

A switch SW1 is turned off during measurement of the eccentricity data and turned on during usual recording/reproduction, respectively. A switch SW2 is set to a fixed input terminal b during measurement of the eccentricity data and is set to a fixed input terminal a during usual recording/reproduction, respectively.

Figure 5:
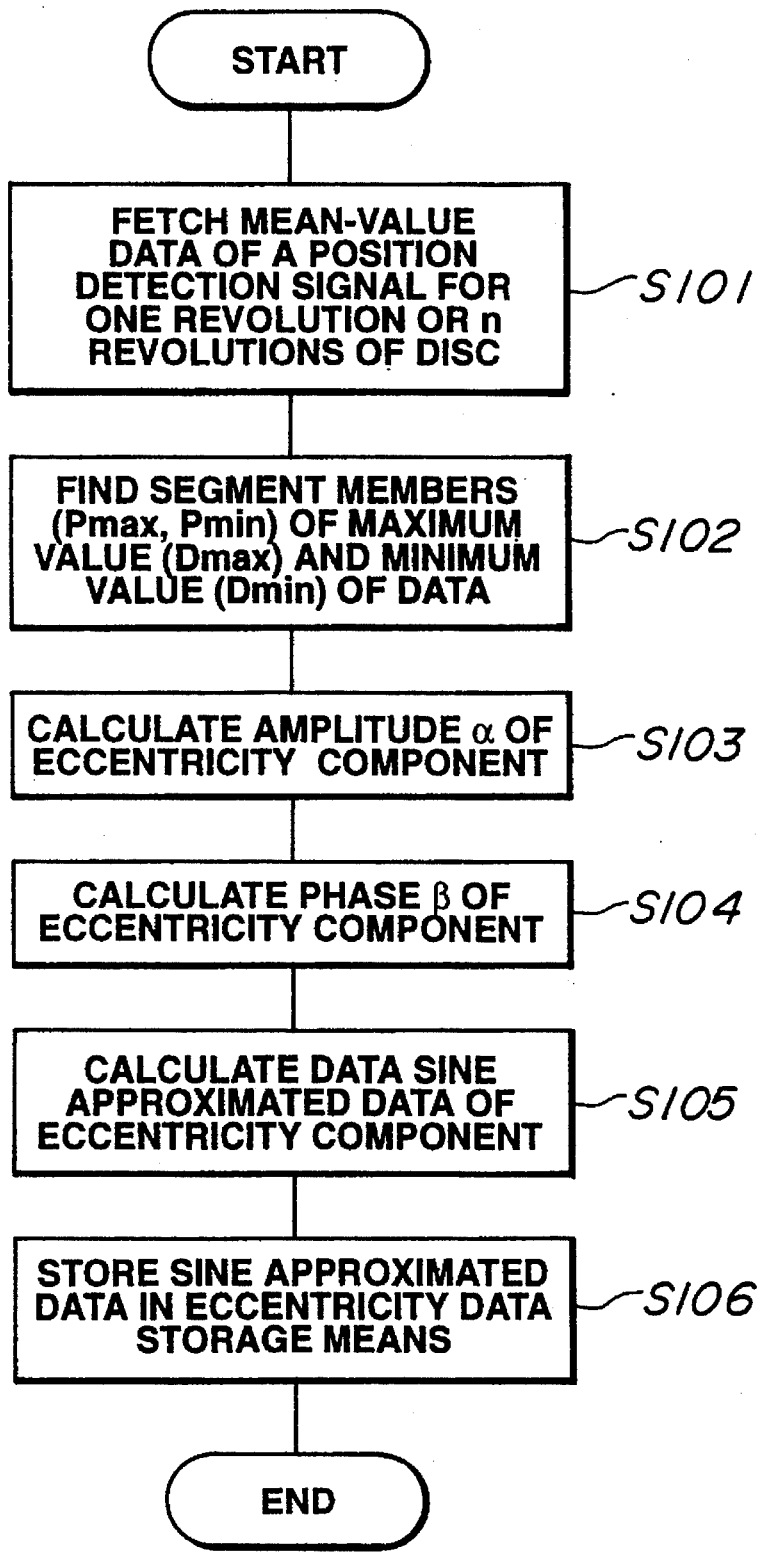
FIG. 5 is a flow chart for illustrating the processing by eccentricity data calculating means.

The eccentricity data is measured by eccentricity data calculating means 12 in accordance with the flow chart shown in FIG. 5.

Figure 6:
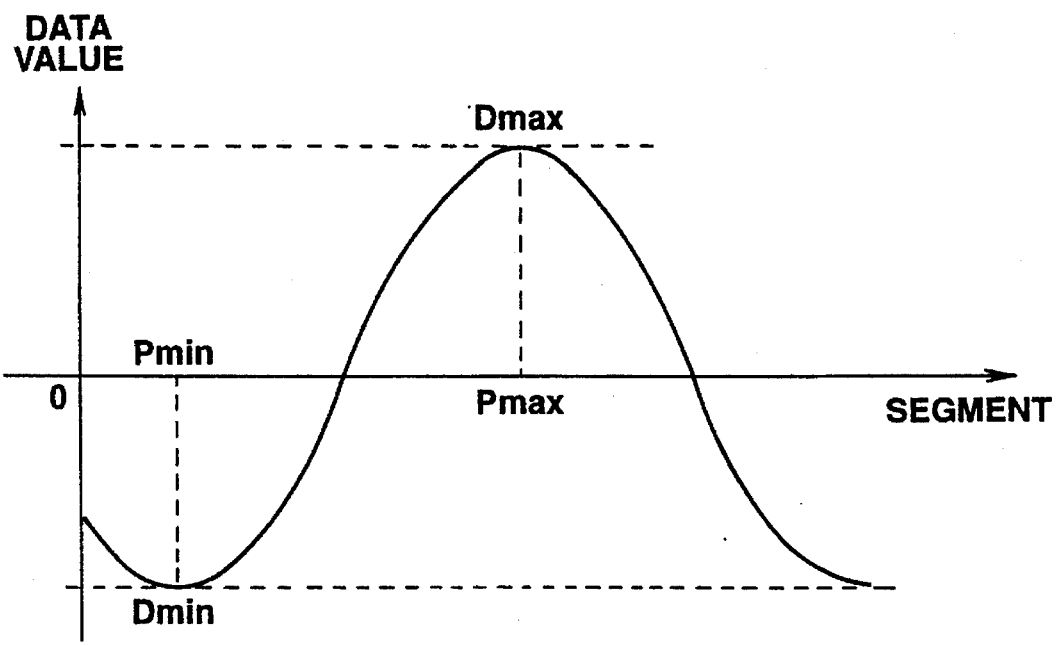
FIG. 6 shows the position detection signal for one complete disc revolution.

Referring to the flow chart of FIG. 5, at a step S101, position detection signal data corresponding to one complete rotation of the disc, or a mean value of the position detection signals over n revolutions, is fetched. The fetched data represents data values each associated with each segment, as shown in FIG. 6. Although the fetched data has continuous values, it is actually discrete data associated with the different segments. At a step S102, a maximum value of data (($D_{max}$) and a minimum value of data ($D_{min}$) as well as associated segment numbers $P_{max}$ and $P_{min}$ are found from the fetched data.

At a step S103, an amplitude $\alpha=(D_{max}-D_{min})/2$ is found.

At a step S104, a phase $\beta=(P_{max}+P_{min})/2$ is found for $P_{max}>P_{min}$.

Figure 7:
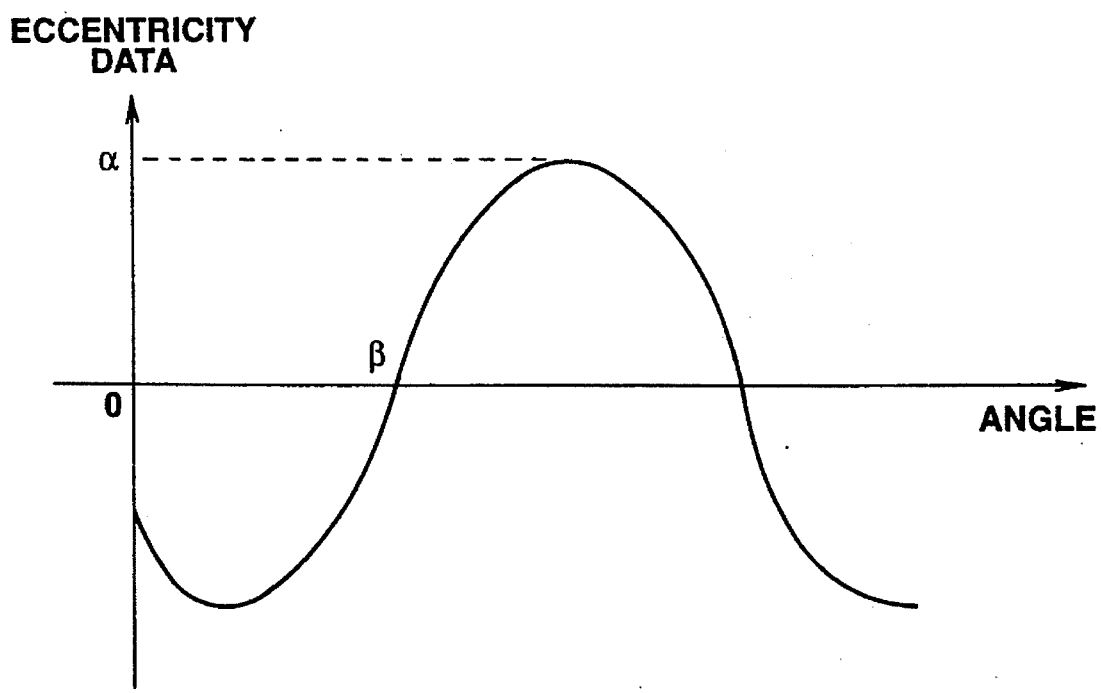
FIG. 7 shows sine wave simulated data of eccentricity components.

For $P_{max}<P_{min}$, the phase $\beta=(P_{max}+P_{min}+S)/2$ is found, where S is the number of segments for one disc revolution. At a step S105, data corresponding to sine simulated eccentricity components are calculated, using the amplitude $\alpha$ and the phase $\beta$. The eccentricity data, shown in FIG. 7, is found by the following equation:

$$Data = \alpha \sin(2\pi \cdot (i+\beta)/S), \text{ where } i=1, 2, \ldots S.$$

At a step S106, the eccentricity data, actually having discrete values, is stored in the eccentricity data storage means.

Figure 8:
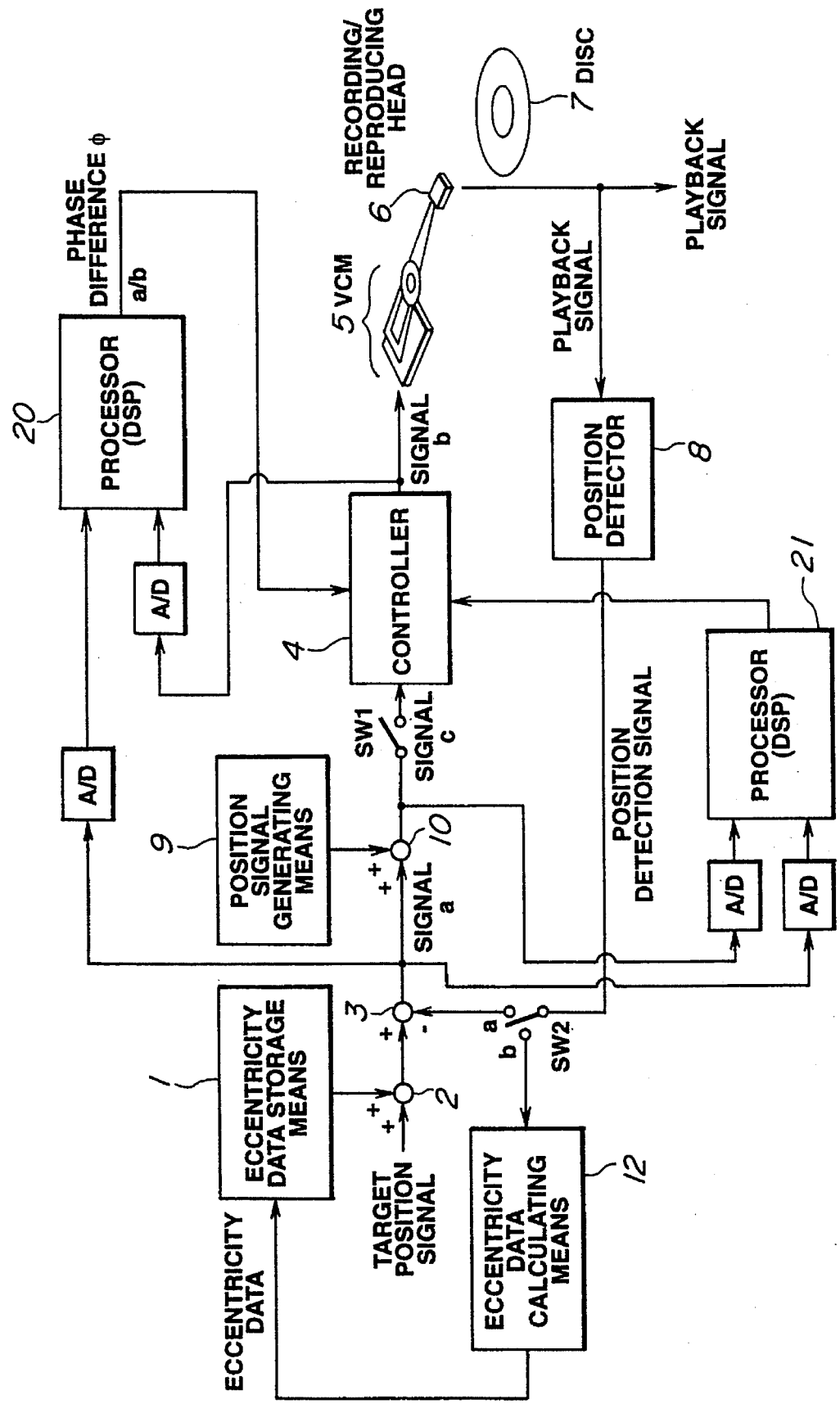
FIG. 8 shows an arrangement of a first embodiment of the disc recording/reproducing apparatus according to the present invention.
Figure 13:
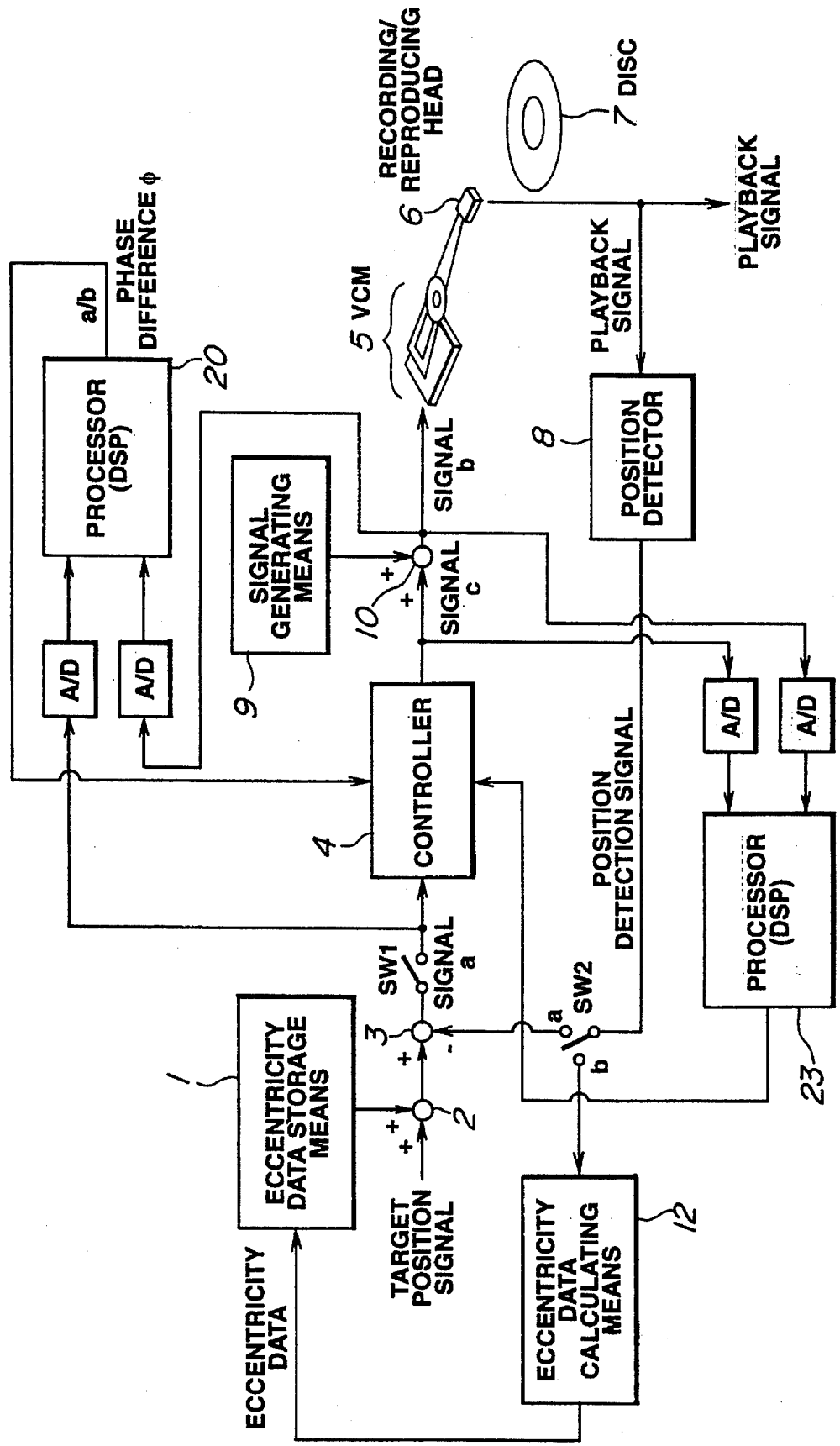
FIG. 13 shows an arrangement of a second embodiment of the disc recording/reproducing apparatus according to the present invention.

With the embodiments shown in FIGS. 8 and 13, the eccentricity data is similarly measured when the power source is turned on. In this case, however, there is no signal applied from position signal generating means 9.

The eccentricity data stored in the eccentricity data storage means 1 is summed at an additive node 2 with a target position signal indicating the pre-set track position. The resulting sum data is supplied to an additive node 3. The actual track position of the recording/reproducing head 6, as detected by a position detection unit 8, is supplied to the subtractive node 3 as a position detection signal. The position detection signal is subtracted from to an output of the additive node 2 to produce a synthesized position signal which will immobilize the recording/reproducing head 6 at a pre-set distance from the center of rotation of the disc. This signal, which is a tracking error signal, is supplied to a controller 4.

The controller 4 is responsive to the input tracking error signal to produce a tracking control signal, which is a signal for controlling a so-called VCM 5 as a position controlling means for the recording/reproducing head 6. By the position controlling operation of the VCM 5, the position of the recording/reproducing head 6 has a constant distance from the center of rotation of the disc 7, thereby reducing the power consumption.

The reproduced signal is provided externally, while also being provided to the position detection unit 8. The position detection unit 8 is responsive to the playback signal to detect the position detection signal which is supplied to the additive node 3.

Figure 4A:
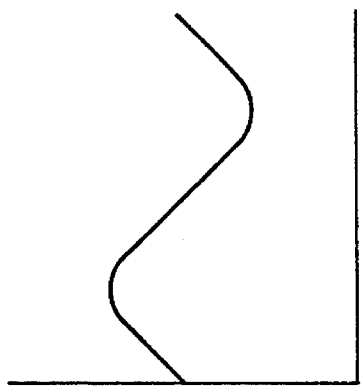
FIGS. 4(a) through 4f show the playback position signal of a disc by the disc recording/reproducing apparatus and a radial position of the recording/reproducing head.
Figure 4C:
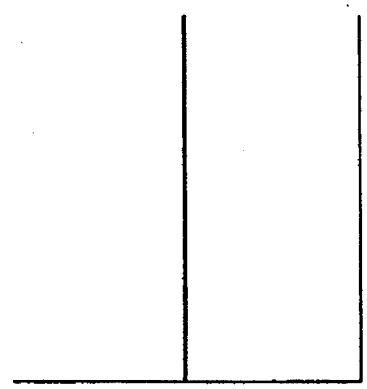

When the recording/reproducing head is physically immobilized at the constant position from the center of rotation of the disc, the recording/reproducing head 6 follows a locus of movement y shown in FIG. 3. At this time, the playback position signal is periodically changed with the eccentricity of the disc as shown in FIG. 4a, due to such eccentricity of the disc, with the distance of the recording/reproducing head 6 from the center of rotation of the disc remaining constant, as shown in FIG. 4b. When the recording/reproducing head is tracked to a pre-set track, the playback position signal assumes a constant value, as shown in FIG. 4c, with the radial position of the recording/reproducing head from the center of rotation of the disc changing in a periodic fashion corresponding to the disc eccentricity, as shown in FIG. 4d.

Figure 4E:
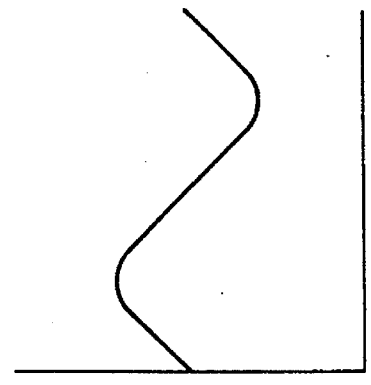
Figure 4B:
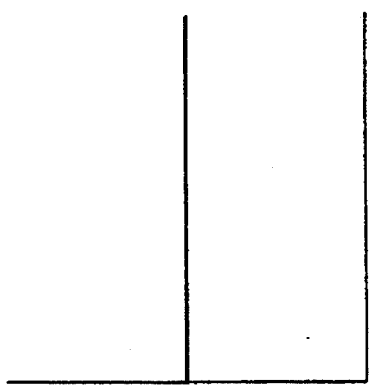
Figure 4D:
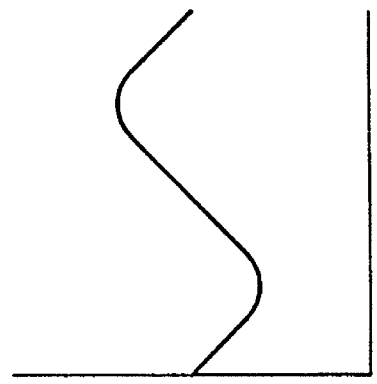
Figure 4F:
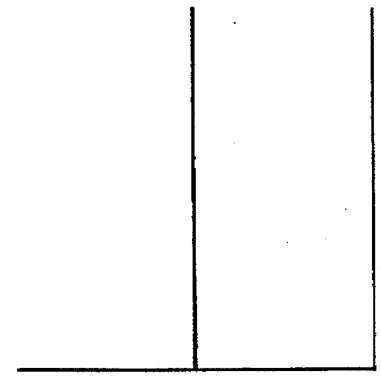

When the recording/reproducing head is position-controlled to a pre-set position, using the disc recording/reproducing apparatus of the present invention, the recording/reproducing head is position-controlled by a new target position signal which has eccentricity data corresponding to the disc eccentricity added thereto, so that the playback position signal is as shown in FIG. 4e which is similar to FIG. 4a. On the other hand, the radial position of the recording/reproducing head from the center of rotation of the disc becomes constant, as shown in FIG. 4f which is similar to FIG. 4b. That is, by setting the target position signal so that the distance of the recording/reproducing head from the center of rotation of the disc remains constant, it is possible to drive the VCM 5 so that the position of the recording/reproducing head remains fixed.

Referring to FIG. 8, a first embodiment of the method of automatically measuring frequency characteristics of the VCM, as position controlling means of the disc recording/reproducing apparatus according to the present invention, is explained.

The additive node 2 sums the eccentricity data from the eccentricity data storage means 1 to the target position signal indicating the pre-set track position. The resulting sum data is supplied to the additive node 3. The additive node 3 takes the difference of an output of the additive node 2 and the position detection signal from the position detection unit 8 to generate a synthesized signal a which, when supplied to the controller 4, immobilizes the recording/reproducing head 6.

The characteristics at a pre-set frequency of the VCM 5, position controlling means for the recording/reproducing head 6, may be determined by wobbling the VCM 5 at the pre-set frequency. Thus a signal generating means 9 generates a sine wave having a pre-set frequency synchronized with the rotational frequency of the disc 7, such as f Hz, for wobbling the VCM 5. The sine wave thus generated is added to the signal a by a sine wave adder 10. The sine wave having the pre-set frequency F may be generated by providing data in a data table or providing a function $A\sin(2\pi ft)$.

An output of the sine wave adder 10, which is the signal a summed with the sine wave of the pre-set frequency F, is provided to the linear controller 4, which outputs a signal b for wobbling the VCM 5 and controlling the movement of the recording/reproducing head 6. The signal reproduced from the disc 7 by the controlled movement of the recording/reproducing head 6, which is a playback signal made up of a fine pattern and an address pattern, is provided externally. The playback signal is also supplied to the position detection unit 8.

The position detection unit 8 is responsive to the input playback signal to output a position detection signal indicating an actual track position of the recording/reproducing head. That is, the address pattern indicates in which track the head is located, and the fine pattern indicates how much the head is offset from the track center.

If the signals a and b are digital signals, they are provided directly. If these signals are analog signals, they are converted into digital signals by an analog/digital (A/D) converter, not shown. Subsequently, the signals a and b are compared by, for example, calculating a quotient a/b or the phase difference $\phi$ of the signals a and b, for finding characteristics of the forcefully driven VCM 5 at the frequency $\omega_1$.

Figure 9:
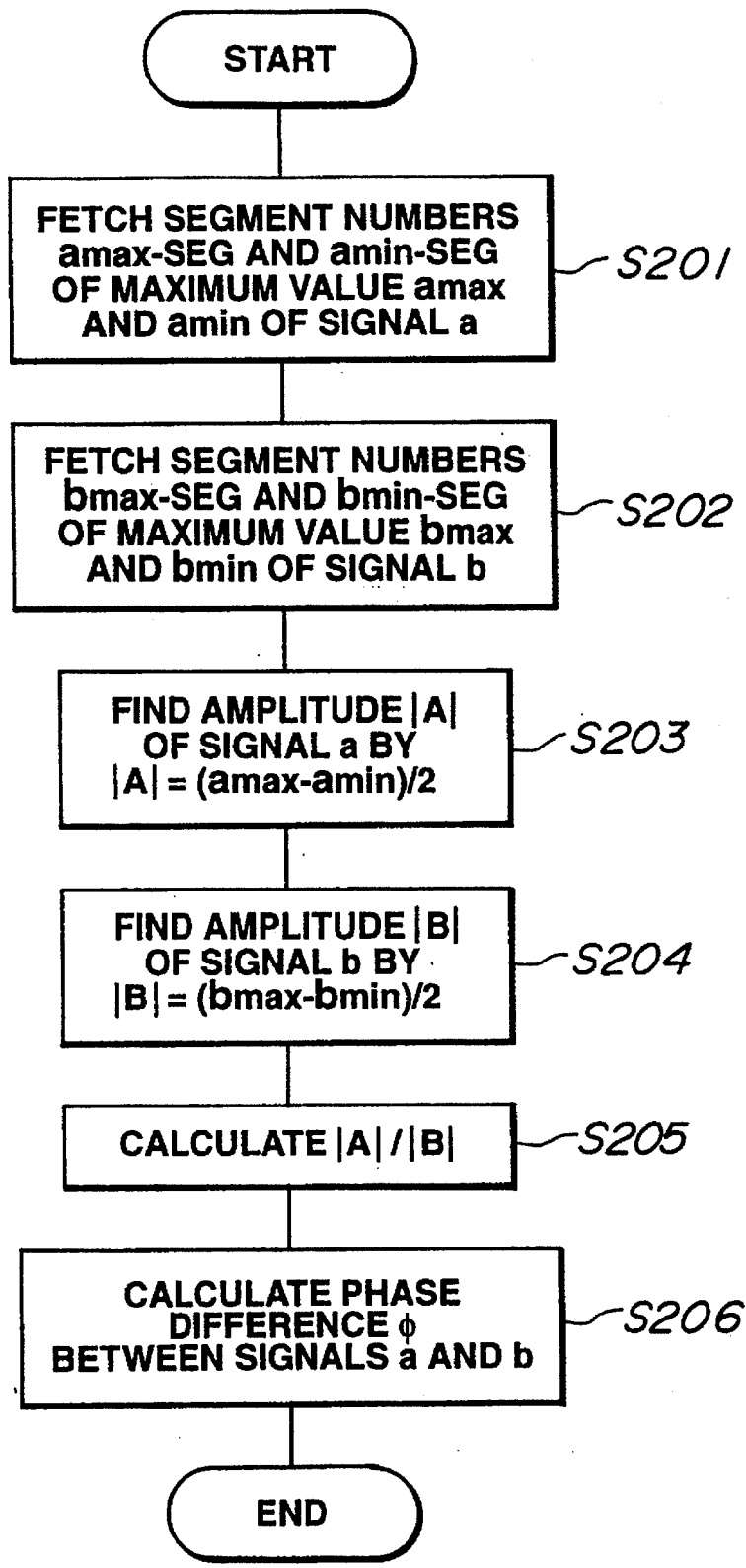
FIG. 9 is a flow chart for illustrating the processing by a processor 20.

The quotient a/b and the phase difference $\phi$ may be calculated by a processor 20 in FIG. 8 in accordance with a flow chart shown in FIG. 9. The processor 20 performs an arithmetic and logical operation of finding the quotient a/b and the phase difference using the respective signals continuing over a number of periods, preferably averaged over these periods. The frequency $\omega_1$ for the arithmetic and logical operation is set so as to be equal to the frequency of disc rotation.

Referring to the flow chart of FIG. 9, at a step S201, a maximum value $a_{max}$ and a minimum value $a_{min}$ of the signal a are fetched out. It is also found in which segment as counted from a home index as a reference point the values $a_{max}$ and $a_{min}$ are located.

At a step S202, an arithmetic and logical operation similar to that in the step S201 is performed.

At steps S203 and S204, the amplitudes of the signals a and b, that is |A| and |B|, are found.

At a step S205, the quotient a/b is found as |A|/|B|.

At a step S206, the phase difference is found by calculating $(a_{max-seg} - b_{max-seg})$, $(a_{min-seg} - b_{min-seg})$, or taking an average value thereof.

From the above, the characteristics of the VCM 5 become $a/b \cdot (\omega t + \phi)$. These characteristics indicate that, if a sine wave is applied by the signal generating means 9, the VCM 5 is actuated with the amplitude of a/b and the phase difference $\phi$.

Therefore, by properly setting the signal b (driving current I) of the VCM 5 equal to $X\sin(\omega t + \psi)$, the disc eccentricity may be decreased if the VCM 5 is wobbled with the frequency $\omega$.

The method of setting the signal b by the controller 4 is now explained.

Figure 10:
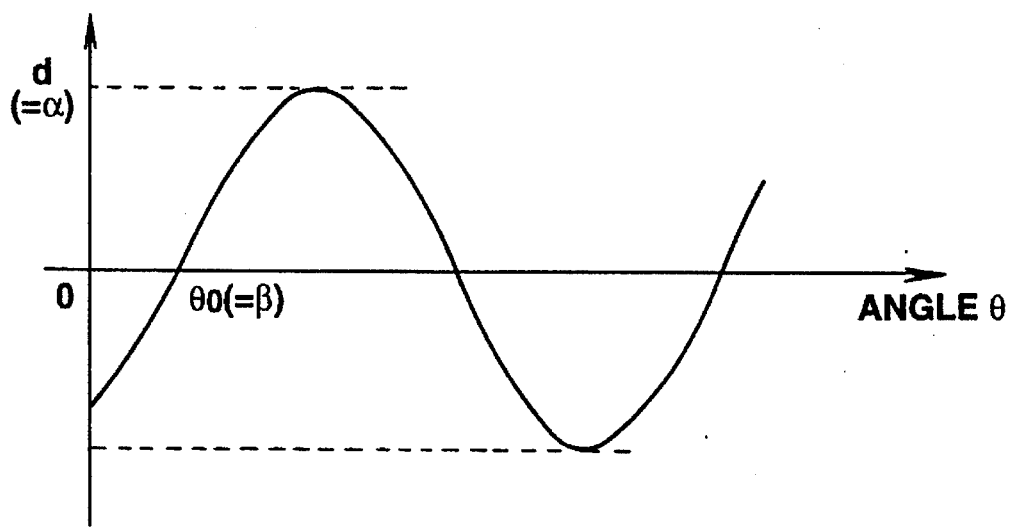
FIG. 10 shows eccentricity data stored in eccentricity data storage means.

If the eccentricity data stored in the eccentricity data storage means 1 is represented by (amplitude |d|, phase $\epsilon$) shown in FIG. 10, it may be seen that the eccentricity may be reduced by wobbling the VCM 5 at the amplitude $-|d|$ and the phase $\Theta_0$.

Consequently, $X = -|b| \cdot |d|/|a|$ and $\psi = \Theta_0 - \phi$.

If an output signal of the adder 10 is a signal c, this signal is provided directly if it is a digital signal. If it is an analog signal, it is provided from the adder 10 after conversion into a digital signal by an analog/digital (A/D) converter, not shown. Subsequently, the signals a and c are compared by, for example, calculating the quotient a/c, for calculating characteristics of the transfer function of the tracking servo system at the frequency $\omega_2$ as required for automatically setting the gain of the controller 4.

Figure 11:
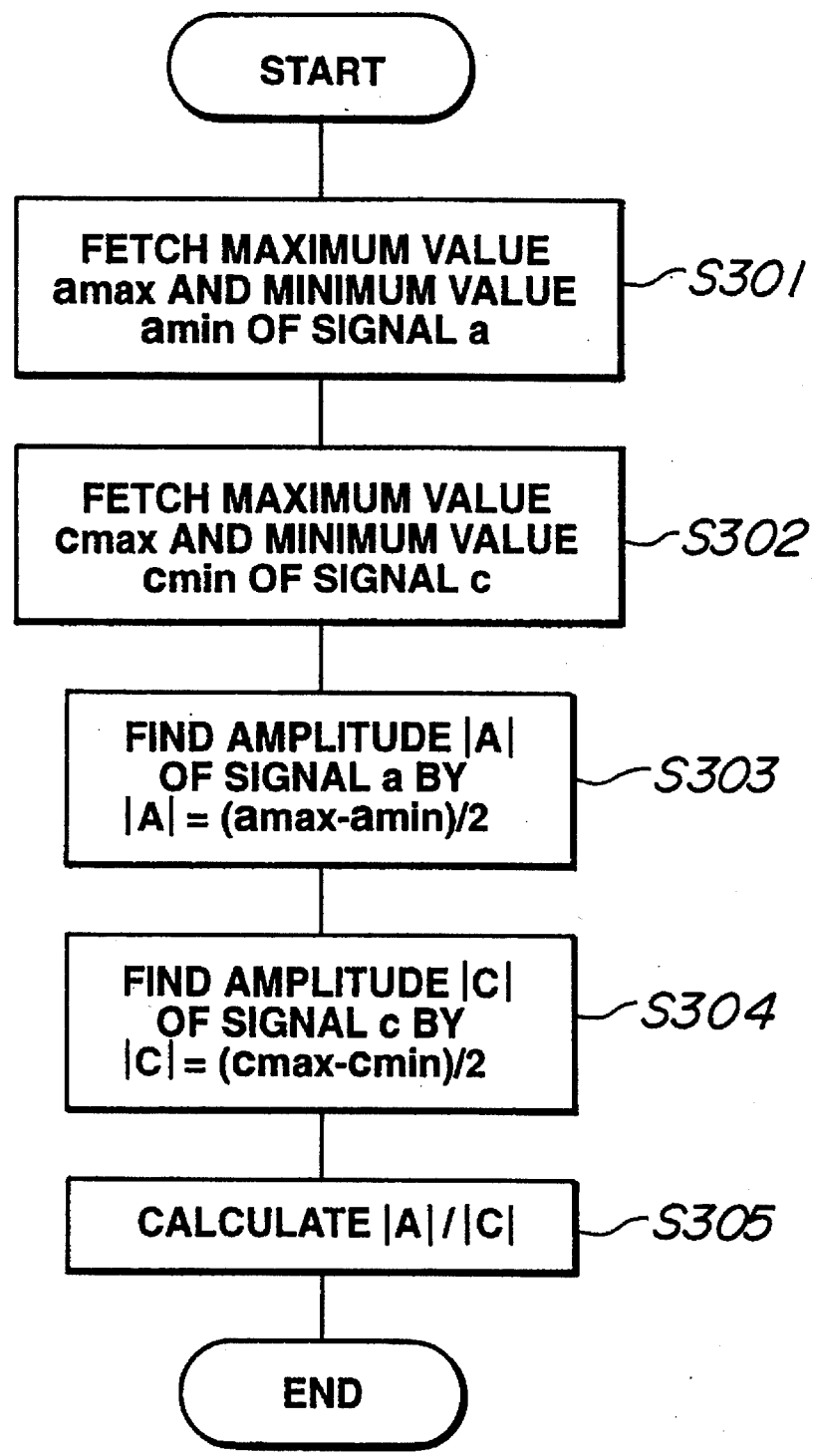
FIG. 11 is a flow chart for illustrating the processing by a processor 21.

The quotient a/c may be found by a processor 21 in FIG. 8 in accordance with a flow chart shown in FIG. 11. The processor 21 performs an arithmetic and logical operation of finding the quotient a/c and the phase difference using respective signals continuing over a number of periods, preferably averaged over these periods. The operation of finding the ratio a/c is omitted because it is the same as the operation of finding the quotient a/b.

The quotient a/c is employed for making the automatic setting of the gain of the controller 4, as described previously.

Figure 12:
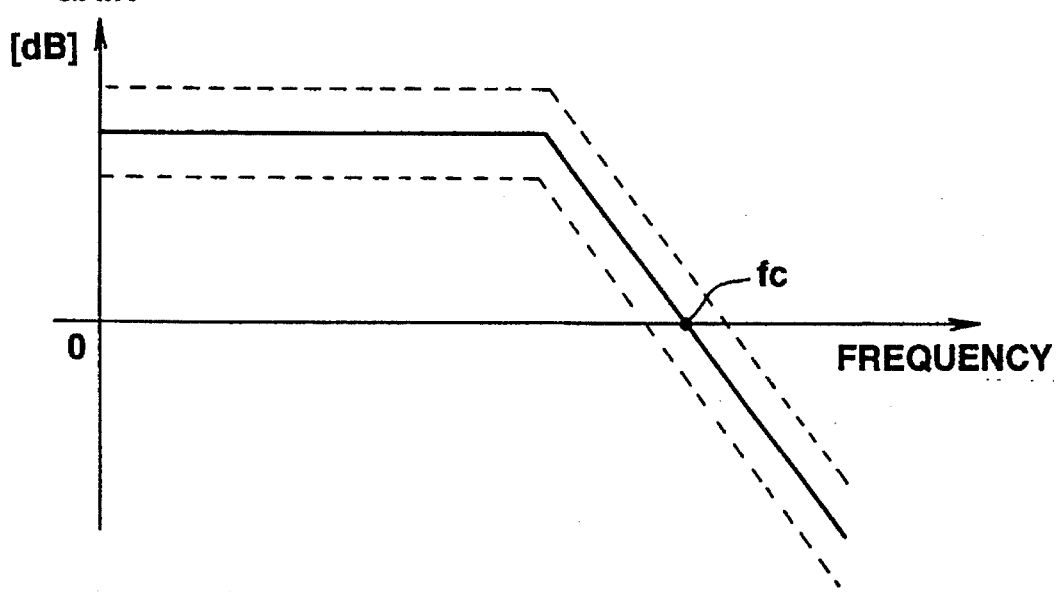
FIG. 12 shows loop transfer function characteristics of a system.

FIG. 12 shows the loop transfer function characteristics of the system.

The quotient a/c is found by setting the frequency $\omega_2$ of a sine wave, generated by the signal generating means 9, so as to be equal to $f_c$.

If the quotient a/c, produced by an arithmetic and logical operation, is equal to unity, the system gain at the frequency $f_c$ becomes equal to 0 dB, so that there is no necessity of adjusting the gain of the controller 4.

If the quotient a/c is not equal to unity, gain adjustment is made by multiplying a controller gain coefficient K by c/a so that the system gain for the frequency $f_c$ is equal to 0 dB.

Referring to FIG. 13, a second embodiment of the method of automatically setting the frequency characteristics of a VCM, as position controlling means of the disc recording/reproducing apparatus of the present invention, is now explained.

A target position signal indicating a pre-set track position is summed by an additive node 2 with eccentricity data from eccentricity data storage means 1, and the resulting sum is supplied to an additive node 3. The additive node 3 then takes the difference of the signal from the additive node 2 and the position detection signal as detected by a position detection unit 8 to produce a synthesized signal a which will fix the recording/reproducing head 6.

The signal a is provided to the controller 4 which then outputs a signal for controlling the position controlling means for the recording/reproducing head 6, that is the VCM 5. An output of the controller 4 is supplied to a sine wave adder 10 where plural sine waves of different frequencies synchronized to the frequency of disc rotation are synthesized for wobbling the VCM 5. The sine waves of the different frequencies may be generated from data in a data table or with a function $A\sin(2\pi ft)$. A signal from the sine wave adder 10 is transmitted as a signal b to the VCM 5 for wobbling the VCM 5 for controlling the movement of the recording/reproducing head 6.

By controlling the movement of the recording/reproducing head 6, the playback signal from the disc 7 is provided externally, while being routed to the position detection unit 8.

The position detection unit 8 outputs a position detection signal, based upon the input playback signals.

If the signals a and b are digital signals, they are provided directly. If these signals are analog signals, they are provided after being converted into digital signals by an analog/digital (A/D) converter, not shown. Subsequently, the signals a and b are compared by, for example, calculating the quotient a/b or the phase difference $\phi$ of the signals a and b, for finding the characteristics of the forcefully driven VCM 5 at the frequency $\omega$. The method of calculating the ratio a/b and the phase difference $\phi$ are the same as those explained in connection with FIG. 8 and are thus not explained herein.

Figure 14:
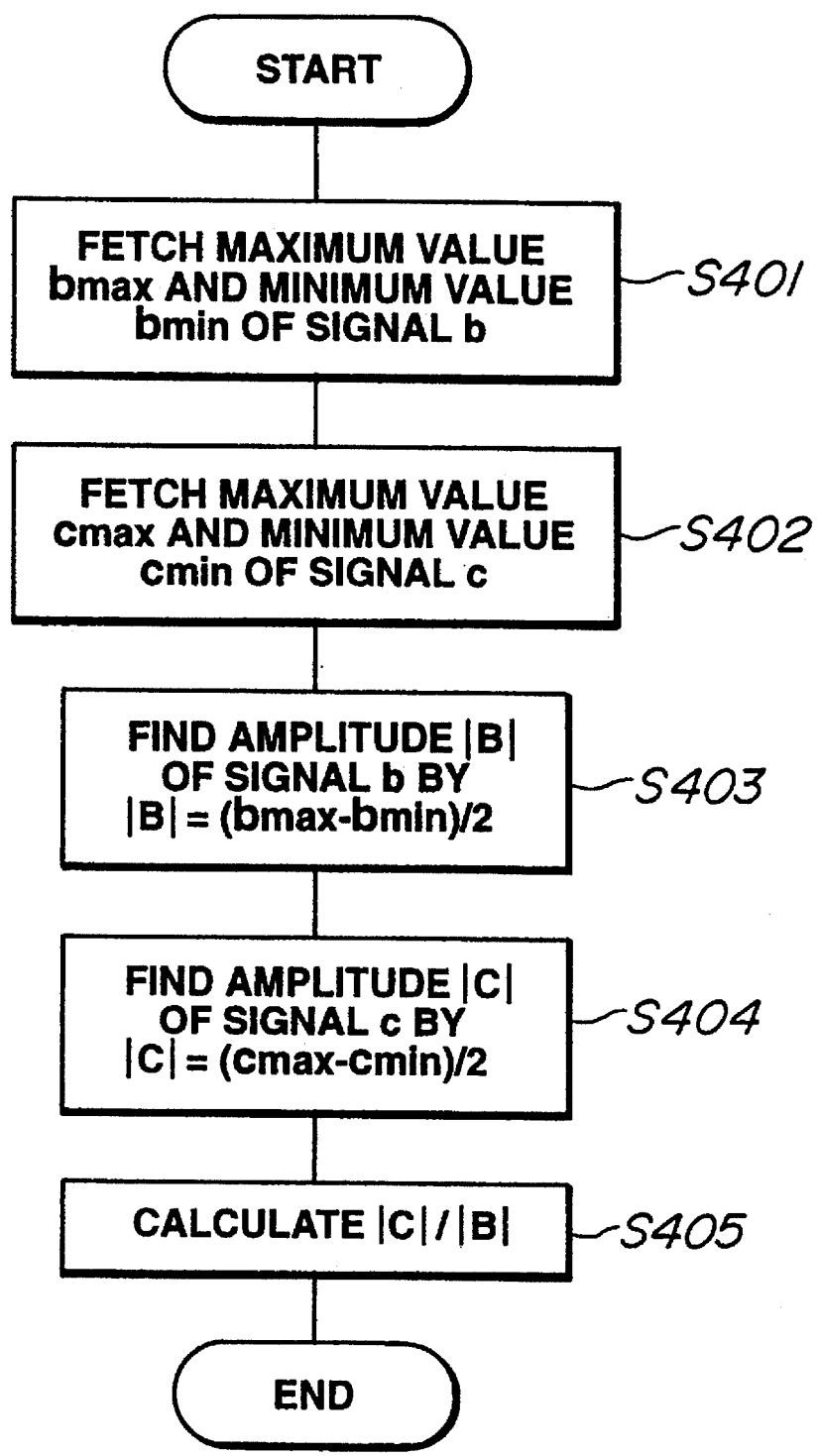
FIG. 14 is a flow chart for illustrating the processing by a processor 23.

If an output signal of the controller 9 is a digital signal c, this signal is provided directly, as are the signals a and b. If it is an analog signal, it is provided after being converted into a digital signal by an analog/digital (A/D) converter, not shown. Subsequently, the signals a and c are compared by, for example, calculating the quotient c/b, for calculating characteristics of the transfer function of the tracking servo system at the frequency $\omega_2$ as required for automatically setting the gain of the controller 4. The quotient c/b may be found by the processor 23 shown in FIG. 13 in accordance with a flow chart shown in FIG. 14.

It is to be noted that the above embodiments are given for illustration only and the present invention is intended to cover many modifications as may come within the scope of the appended claims.

What is claimed is:

1. A disc recording/reproducing apparatus comprising:

a disc-shaped recording medium having tracks which are substantially concentric about a center point;

a tracking servo system, including driving means, for controlling the position of a recording/reproducing head, the recording/reproducing head being moved based upon a target position signal indicating a target position of the head on the disc-shaped recording medium, the recording/reproducing head being controlled in its position by the driving means employing an output of a controller fed with a deviation between the target position and an actual position of the recording/reproducing head;

eccentricity data storage means for storing eccentricity data indicating a difference between a center of rotation of the disc-shaped medium and the center point;

first addition means for adding the eccentricity data from the eccentricity data storage means to the target position signal; and position controlling means for controlling the position of the recording/reproducing head using an output of the first addition means so that the position of recording/reproducing head relative to the center of rotation of the disc-shaped medium remains constant when the disc recording/reproducing apparatus is in a stand-by state.

2. The disc recording/reproducing apparatus as claimed in claim 1, further comprising:

signal generating means for generating a sine wave of a pre-set frequency;

second addition means for summing the sine wave of the pre-set frequency from the signal generating means with an output of the first addition means; and measurement means for measuring frequency characteristics of the driving means as the recording/reproducing head is wobbled using an output signal of the second addition means.

3. The disc recording/reproducing apparatus as claimed in claim 2, wherein:

the measurement means measures a transfer function of the tracking servo system.

4. The disc recording/reproducing apparatus according to claim 2, wherein the frequency characteristic measured by the measurement means is:

$$a/b \cdot (\omega t + \phi)$$

where a is an amplitude of the output of the first addition means, b is the amplitude of the output of the second addition means, ω is the pre-set frequency of the sine wave of the signal generating means, t is time, and φ is a phase difference between the signal output by the first addition means and the signal output by the second addition means.

5. The disc recording/reproducing apparatus as claimed in claim 1, further comprising:

signal generating means for generating plural sine waves of different frequencies;

second addition means for summing the sine waves of the different frequencies from the signal generating means with an output of the first addition means; and measurement means for measuring frequency characteristics of the driving means as the recording/reproducing head is wobbled using an output signal of the second addition means.

6. The disc recording/reproducing apparatus as claimed in claim 5, wherein the measurement means measures a transfer function of the tracking servo system.

7. The disc recording/reproducing apparatus according to claim 5, wherein the frequency characteristic measured by the measurement means is:

$$a/b \cdot (\omega t + \phi)$$

where a is an amplitude of the output of the first addition means, b is the amplitude of the output of the second addition means, ω is the pre-set frequency of the sine wave of the signal generating means, t is time, and φ is a phase difference between the signal output by the first addition means and the signal output by the second addition means.

8. The disc recording/reproducing apparatus as claimed in claim 1, wherein:

each rotation of a data track about the center point of the data tracks is broken into S segments; and the eccentricity storage data for an ith segment is given by the expression:

$$a \sin(2\pi \cdot (i+\beta)/S)$$

where a is the amplitude of an eccentricity between the center of the data tracks and the center of rotation and β is the phase of the eccentricity between the center of the data tracks and the center of rotation.

* * * * *